(12) United States Patent
Sarban et al.

(10) Patent No.: US 11,230,078 B2
(45) Date of Patent: Jan. 25, 2022

(54) PRESS-WORKING APPARATUS AND RELATED METHOD

(71) Applicant: ElastiSense ApS, Aabenraa (DK)

(72) Inventors: Rahimullah Sarban, Brønshøj (DK); Benjamin Thomsen, Aabenraa (DK)

(73) Assignee: ELASTISENSE APS, Aabenraa (DK)

( * ) Notice: Subject to any disclaimer, the term of this patent is extended or adjusted under 35 U.S.C. 154(b) by 112 days.

(21) Appl. No.: 16/465,030

(22) PCT Filed: Nov. 24, 2017

(86) PCT No.: PCT/DK2017/050393
§ 371 (c)(1),
(2) Date: May 29, 2019

(87) PCT Pub. No.: WO2018/099529
PCT Pub. Date: Jun. 7, 2018

(65) Prior Publication Data
US 2019/0322065 A1    Oct. 24, 2019

(30) Foreign Application Priority Data

Dec. 1, 2016   (DK) .......................... PA 2016 70953

(51) Int. Cl.
*B30B 15/00*    (2006.01)
*B30B 15/26*    (2006.01)
(Continued)

(52) U.S. Cl.
CPC .......... *B30B 15/0094* (2013.01); *B30B 15/26* (2013.01); *B21D 24/04* (2013.01);
(Continued)

(58) Field of Classification Search
CPC ..... B30B 15/0094; B30B 15/26; B30B 15/14; B30B 15/28; B30B 15/00; B30B 15/281; B21D 24/04; B21D 55/00; G01B 5/30
(Continued)

(56) References Cited

U.S. PATENT DOCUMENTS 4,010,679 A    3/1977  Dybel
4,327,591 A    5/1982  Dybel et al.
(Continued)

FOREIGN PATENT DOCUMENTS

EP    0 612 992 A2    8/1994
JP    2001-137954 A    5/2001
(Continued)

OTHER PUBLICATIONS

Danish Examination Report with Search Report dated Jul. 4, 2017 for Danish Application No. PA 2016 70953.
(Continued)

*Primary Examiner* — Jimmy T Nguyen
(74) *Attorney, Agent, or Firm* — Xsensus LLP

(57) ABSTRACT

Disclosed herein is a press-working apparatus, monitoring device, and method of operating a press-working apparatus with a press-working monitoring device and one or more displacement sensors configured to provide a first output signal indicative of deformation of the first sensing part. The method can be configured for determining if an error criterion based on the first output signal from the first displacement sensor has been met, and providing a control signal indicative of an error to the press-working apparatus if the error criterion is met.

11 Claims, 9 Drawing Sheets

(51) Int. Cl.
  *B21D 24/04* (2006.01)
  *B21D 55/00* (2006.01)
  *B30B 15/14* (2006.01)
  *B30B 15/28* (2006.01)
  *G01B 5/30* (2006.01)

(52) U.S. Cl.
  CPC .............. *B21D 55/00* (2013.01); *B30B 15/14* (2013.01); *B30B 15/28* (2013.01); *G01B 5/30* (2013.01)

(58) Field of Classification Search
  USPC ................................ 72/16.1, 17.2, 20.1, 21.1
  See application file for complete search history.

(56) References Cited

U.S. PATENT DOCUMENTS

| | | | |
|---|---|---|---|
| 4,408,520 A * | 10/1983 | Wons .................... | B30B 15/007 100/324 |
| 5,090,282 A | 2/1992 | Ruesch | |
| 5,271,254 A * | 12/1993 | Gloe .................... | B30B 15/0094 29/705 |
| 5,505,093 A | 4/1996 | Giedd et al. | |
| 7,401,506 B2 * | 7/2008 | Kunow .................... | G01B 7/18 73/161 |
| 2008/0078255 A1 | 4/2008 | Ngo et al. | |
| 2008/0216676 A1 * | 9/2008 | Robinson ............ | B41F 33/0072 100/99 |
| 2009/0007685 A1 | 1/2009 | Cheng et al. | |
| 2010/0126361 A1 | 5/2010 | Fukami et al. | |

FOREIGN PATENT DOCUMENTS

| | | |
|---|---|---|
| JP | 2002-192399 A | 7/2002 |
| JP | 2009-012006 A | 1/2009 |
| SU | 1075094 A | 2/1984 |
| WO | WO 2016/036261 A1 | 3/2016 |

OTHER PUBLICATIONS

International Search Report and Written Opinion dated Feb. 13, 2018 for PCT/DK2017/05093.

* cited by examiner

PRESS-WORKING APPARATUS AND RELATED METHOD

CROSS REFERENCE TO RELATED APPLICATIONS

This is the U.S. national phase application based on PCT/DK2017/050393 filed Nov. 24, 2017, which is based on Danish Application PA 2016 70953, filed Dec. 1, 2016, the entire contents of all of which is hereby incorporated by reference.

FIELD

The present invention relates to monitoring of press-working apparatus and related method. In particular, a method for operating a press-working apparatus, a press-working monitoring device, and a press-working apparatus is described.

BACKGROUND

The stroke rate and production quality of press-working apparatus is increasing to provide a large and high quality throughput. This also means that there is a need to be able to identify and react on errors during operation at an early stage, preferably before the error occurring.

Further, the increasing complexity and costs of the press-working tools has revealed a desire to be able to identify wear and tear on tool parts prior to break-down of the tool.

Furthermore, the design of press-working tools, in many cases, has been based on empirical observations and designers experience. A method to quantify the mechanical characteristics of a tool (bending, twisting, vibration, and similar) objectively and effectively while in operation may be desired.

SUMMARY

There is a need for apparatus and/or methods facilitating a reduction in the number of faulty items and/or improving the quality of items being output from high-through-put press-working apparatus.

Accordingly, a method of operating a press-working apparatus with a press-working monitoring device and one or more displacement sensors including a first displacement sensor comprising a first primary attachment part mounted on a first part of the press-working apparatus, a first secondary attachment part mounted on a second part of the press-working apparatus, and a first sensing part, the first sensing part being arranged between the first primary attachment part and the first secondary attachment part, wherein the first displacement sensor is configured to provide a first output signal indicative of deformation, e.g. stretching and/or relaxing, of the first sensing part is provided, the method comprising: obtaining the first output signal from the first displacement sensor while moving the first part and the second part along a main axis in relation to each other, thereby deforming the first displacement sensor. Further, the method optionally comprises determining if an error criterion based on the first output signal from the first displacement sensor has been met; and optionally providing a control signal indicative of an error to the press-working apparatus if the error criterion is met.

Further, a press-working monitoring device for a press-working apparatus is provided, the press-working monitoring device comprising a housing with a processor unit, a memory, and an interface, wherein the press-working monitoring device is configured to obtain a first output signal from a first displacement sensor while moving a first part and a second part of the press-working apparatus along a main axis in relation to each other, thereby deforming the first displacement sensor. Further, the press-working monitoring device is optionally configured to determine if an error criterion based on the first output signal from the first displacement sensor has been met; and provide a control signal indicative of an error, e.g. to the press-working apparatus, if the error criterion is met. The press-working monitoring device may be configured to perform the method as described herein.

Also, a press-working apparatus comprising a first part and a second part arranged to be moved along a main axis in relation to each other is disclosed, wherein the press-working apparatus comprises one or more displacement sensors including a first displacement sensor comprising a first primary attachment part, a first secondary attachment part and a first sensing part, the first sensing part being arranged between the first primary attachment part and the first secondary attachment part, wherein the first displacement sensor is configured to provide a first output signal indicative of deformation of the first sensing part, and wherein the first primary attachment part is attached to the first part and the first secondary attachment part is attached to the second part, wherein the press-working apparatus comprises a press-working monitoring device as described herein, and wherein the first displacement sensor is connected to the interface of the press-working monitoring device for obtaining the first output signal in the press-working monitoring device.

It is an important advantage of the present disclosure that faulty operation of a press-working apparatus can be detected in a fast and reliable manner.

Further, the present disclosure advantageously provides an optimum use of a tool or parts thereof, by enabling tool part replacement at an optimum point in time, thus avoiding replacement of a tool part too early when not necessary and avoiding replacement of a tool part too late, which may lead to severe damages to the press-working apparatus/tool.

It is an important advantage of the present disclosure that the press-working apparatus and/or method can detect and react to very small travel distance variations, e.g. down to 0.03 mm or less. The high precision and/or the reliable (error-safe) determination of travel distance variations during operation of the press-working apparatus enables an operator/the press-working machine to detect and react to errors in a fast and efficient manner, in turn ensuring minimum downtime (high productivity) with reduced material waste.

Furthermore, the present disclosure enables a tool designer and manufacturer to quantify mechanical characteristics of press-working tools in different operation conditions. For example, the mechanical characteristics of a tool such as bending, twisting, vibration, and similar may vary when installed in different press-working machines, and/or when pressing different type of materials, and/or when pressing material with different dimensions, and/or when operated at different stroke rates. By characterizing the mechanical characteristics of a tool using methods and devices disclosed herein, an optimum operation condition for the tool can be objectively quantified and recommended to the operators. This will increase the lifetime and service life of the press-working tool.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
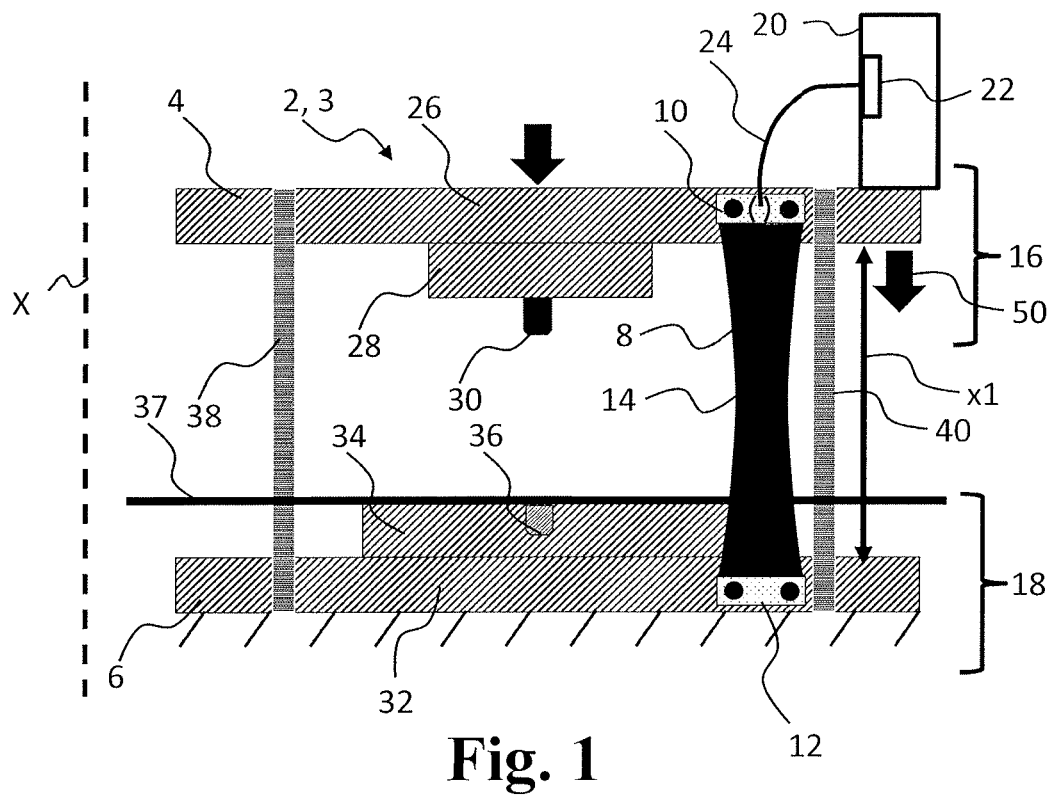
FIG. 1 schematically illustrates an exemplary press-working apparatus with the tool in open position, FIG. 2 schematically illustrates an exemplary press-working apparatus with the tool in closed position, FIG. 3 schematically illustrates an exemplary method, FIG. 4 schematically illustrates an exemplary press-working monitoring device.

The present disclosure relates to the use of at least one stretchable displacement sensor for monitoring and determining faulty press-working, such as punching, drawing, buckling, and/or blanking and/or tool malfunction in a press-working apparatus.

The method of operating a press-working apparatus with a press-working monitoring device enables an operator to optimize the operation of the press-working parameters and to improve the uptime of the press-working apparatus. For high-throughput press-working apparatus, even small improvements in uptime have a significant impact on the production costs.

The press-working apparatus comprises a tool with tool parts including a first tool part and a second tool part, wherein the first tool part is movably arranged in relation to the second tool part. The press-working apparatus may be a progressive press-working apparatus, i.e. a press-working apparatus with an automatic feeding of blank material. Typically, one of the tool parts, e.g. the second tool part is stationary, and another tool part, e.g. the first tool part, is moved between a first or initial position where the first tool part and the second tool part are separated and a second or engaged position where the first tool part and the second tool part are engaged. The first tool part may also be denoted or comprise a top plate. The second tool part may also be denoted or comprise a bottom plate.

The tool may comprise a third tool part. The third tool part may be a middle plate. Typically, the middle plate is used for holding or securing the blank in the press-working apparatus during press-working. The third tool part may be movably arranged in relation to the first tool part and/or the second tool part.

The press-working monitoring apparatus comprises one or more displacement sensors including a first displacement sensor. The press-working apparatus may comprise a second displacement sensor. The press-working apparatus may comprise a third displacement sensor and/or a fourth displacement sensor. A displacement sensor comprises a primary attachment part, a secondary attachment part and a sensing part between the primary attachment part and the secondary attachment part. The displacement sensor(s) is/are elastically deformable and configured to be stretched by increasing the distance between the primary attachment part and the secondary attachment part. The electrical properties of the sensing part changes when the displacement sensor is deformed, e.g. by stretching and/or relaxing. An exemplary displacement sensor comprises a primary layer of a conductive polymer material and a first secondary layer of a conductive polymer material, wherein the primary layer and the first secondary layer are separated by a first intermediate layer of a dielectric material. The displacement sensor(s) may comprise a second secondary layer of conductive polymer, wherein the primary layer and the second secondary layer are separated by a second intermediate layer of a dielectric material. The electrical properties of the sensing part and changes thereof, such as the capacitance between conductive layers and/or resistance of conductive layer(s), are thus indicative of how much the displacement sensor is stretched and/or relaxed. A first terminal of the displacement sensor is connected to the primary layer. A second terminal of the displacement sensor may be connected to the first secondary layer and/or the second secondary layer. A second terminal of the displacement sensor may be connected to the primary layer. The first and second terminals may be arranged on the first primary attachment part or on the second primary attachment part.

The displacement sensor(s) may be characterized by a stretchability of a least 1.1, i.e. the displacement sensor(s) can be stretched to a length of a least 1.1 times of the length of the un-tensioned displacement sensor. The displacement sensor(s) may have a stretchability of at least 1.3. The displacement sensor(s) may have a stretchability in the range from 1.5 to 5, such as from 1.8 to 3. The displacement sensor(s) may be stretchable displacement sensor(s), wherein the sensing part can stretch from a first position (un-tensioned) with a first length L1 to a second position with a second length L2, e.g. wherein the second length L2 is at least 1.1'L1, such as at least 1.3*L1.

The first primary attachment part of the first displacement sensor is mounted on a first part of the press-working apparatus. The first part of the press-working apparatus may be a first tool part of the tool. In one or more exemplary methods and/or press-working apparatus, the first part of the press-working apparatus may be a third tool part of the tool, e.g. in the form of a middle plate of the tool.

The first secondary attachment part of the first displacement sensor is mounted on a second part of the press-working apparatus. The second part of the press-working apparatus may be a second tool part. In one or more exemplary methods and/or press-working apparatus, the second part of the press-working apparatus may be a third tool part of the tool, e.g. in the form of a middle plate of the tool.

The method comprises obtaining the first output signal, also denoted s1, from the first displacement sensor while moving the first part and the second part along a main axis in relation to each other, thereby deforming, e.g. stretching and/or relaxing, the first displacement sensor. The method may comprise obtaining a plurality of output signals from a respective plurality of displacement sensors. Output signals from displacement sensors are also denoted s1, s2, . . . , sN, respectively, where N is the number of displacement sensors.

The method optionally comprises determining if an error criterion based on the first output signal from the first displacement sensor has been met. The error criterion may be based on a plurality of output signals from a respective plurality of displacement sensors.

Further, the method optionally comprises providing a control signal indicative of an error to the press-working apparatus if the error criterion is met.

The method may comprise determining one or more operation parameters of the press-working apparatus based on the output signal(s) from respective displacement sensor(s) mounted between inter-movable parts of the press-working apparatus. A first operating parameter of the one or more operation parameters of the press-working apparatus may be indicative of bending of a tool part. A second operating parameter of the one or more operation parameters of the press-working apparatus may be indicative of twisting of a tool part. A third operating parameter may be indicative of parallelism between the first and the second tool parts. The error criterion may be based on the one or more operation parameters of the press-working apparatus.

The one or more displacement sensors may include a second displacement sensor comprising a second primary attachment part, a second secondary attachment part and a second sensing part, the second sensing part being arranged between the second primary attachment part and the second secondary attachment part. The second primary attachment part and the second secondary attachment part are mounted on inter-movable parts of the press-working apparatus, wherein the second displacement sensor is configured to provide a second output signal indicative of deformation of the second sensing part. The second primary attachment part may be mounted on the first part, e.g. first tool part or third tool part, or on a third part, e.g. a third tool part of the press-working apparatus. The second secondary attachment part may be mounted on the second part or on the third part of the press-working apparatus. The method may comprise obtaining the second output signal from the second displacement sensor while moving the inter-movable parts in relation to each other, thereby deforming, e.g. stretching and/or relaxing, the second displacement sensor. The error criterion may be based on the second output signal from the second displacement sensor.

A plurality of displacement sensors between two inter-movable parts may be advantageous by enabling a more detailed analysis of the spatial variations in travel distances. For example, arranging displacement sensors at different positions between parts may enable detection of twist, and/or bending, and or parallelism of tools parts. For example, at least two displacement sensors, e.g. a first displacement sensor and a third displacement sensor, may be mounted to different sides of the first part, e.g. top plate of a first tool part. At least two displacement sensors, e.g. a first displacement sensor and a second displacement sensor, may be mounted on the same side of the top plate, e.g. at a distance of at least 5 cm or at least 10 cm.

In one or more exemplary methods, determining if an error criterion based on the first output signal from the first displacement sensor has been met may comprise determining a first travel distance parameter, also denoted d1, and/or a second travel distance parameter, also denoted d2, based on the first output signal. The first travel distance parameter d1 may be indicative of travel distance between the first part and the second part, e.g. in a first operating period of the press-working apparatus. The second travel distance parameter d2 may be indicative of travel distance between the first part and the second part, e.g. in a second operating period of the press-working apparatus. The first operating period may be before the second operating period. The first operating period and the second operating period may partly overlap. The error criterion may be based on the first travel distance parameter and/or the second travel distance parameter.

The error criterion may be met if a relation, such as a difference, quotient, or other functional relationship, between the first travel distance parameter and the second travel distance parameter is larger than an error threshold. The error criterion may be met if a relation, such as a difference, quotient, or other functional relationship, between the first travel distance parameter and the second travel distance parameter is smaller than an error threshold. The error criterion may comprise one or more subcriteria, wherein the error criterion is met if a subcriterion is met.

For example, the error criterion may be met if:

$$|d1-d2|>D1,$$

where d1 e.g. is the travel distance TD1 between the first part and the second part in a first operating period T1 of the press-working apparatus (measured by displacement sensor), d2 e.g. is the travel distance TD2 between the first part and the second part in a second operating period T2 of the press-working apparatus (measured by displacement sensor), and D1 is a first error threshold, e.g. 30 µm. The second operating period may be later than or at least partly overlapping with the first operating period.

The error criterion may be based on a plurality of first travel distance parameters from a plurality of displacement sensors in the first operating period. For example, a difference in travel distances measured by a first displacement sensor and a second displacement sensor in a first operating period may be indicative of undesired or erroneous twisting and/or bending of the tool. The error criterion may be met if a relation between first travel distance parameters in a first operating period is larger than a second error threshold.

For example, the error criterion may be met if:

$$|d1\_1-d2\_1|>D2,$$

where d1_1 is the travel distance (or mean travel distance) between the first part and the second part in a first operating period T1 of the press-working apparatus measured by first displacement sensor, d2_1 is the travel distance (or mean travel distance) between the first part and the second part in the first operating period of the press-working apparatus measured by second displacement sensor, and D2 is a second error threshold.

In one or more exemplary devices/methods, the first travel distance parameter d1 and/or the second travel distance parameter d2 is based on a plurality of output signals.

An operating period of the press-working apparatus may comprise one or more operating cycles of the press-working apparatus, wherein each operating cycle has one or more travel distance measures (e.g. one or more of maximum travel position, minimum travel position, travel distance, e.g. difference between maximum and minimum travel position, and travel distance derivative(s)) related thereto. A travel distance parameter, such as d1 and/or d2, may be based on max and/or min travel position(s) and/or travel distances in a respective operating period. A travel distance parameter, such as d1 and/or d2, may be a mean value of travel distances in an operating period.

In one or more exemplary methods, the error criterion is met if the relation between the first travel distance parameter and the second travel distance parameter is indicative of a travel distance difference between the first operating period and the second operating period of at least in the range from 0.050 mm to 0.5 mm.

In one or more exemplary methods, the error criterion is met if the relation between the first travel distance parameter and the second travel distance parameter is indicative of a travel distance difference between the first operating period and the second operating period of at least in the range from 0.010 mm to 0.050 mm. Thus, the present disclosure can identify and react on very small variations in travel distance between the inter-movable parts. This is in particular advantageous since such small variations can entail errors in the end products. Such errors in the end products can e.g. be scratches on the surface, and/or undesired variation in dimensions specifically thickness, and/or tears.

Obtaining output signal(s) from displacement sensor(s) may comprise applying a current to the displacement sensor(s), and wherein the output signal(s) is/are a voltage signal. The displacement sensors may be capacitive sensors, i.e. stretching and relaxing the displacement sensor causes a well-defined change in capacitance between the first terminal and the second terminal. In one or more exemplary methods, obtaining the first output signal from the first displacement sensor comprises applying a current to the first displacement sensor, and wherein the first output signal is a voltage signal. The displacement sensors may be resistive sensors, i.e. stretching and relaxing the displacement sensor causes a well-defined change in resistance between the first terminal and the second terminal. Capacitive displacement sensors may be preferred due to robustness against environmental changes, such as temperature changes, humidity changes, pressure changes, etc.

The press-working apparatus operates in operating cycles. An operating cycle may comprise a first part moving from a first position to a second position and back to first position. An operating cycle may comprise a first part and a second part moving a travel distance in relation to each other from a first position to a second position. The travel distance of the first part in relation to the second part may be at least 5 mm, such as in the range from 8 mm to 20 mm. In one or more exemplary methods, e.g. where the first part is the first tool part and the second part is the third tool part, the travel distance of the first part in relation to the second part may be in the range from 10 mm to 100 mm. In one or more exemplary methods, e.g. where the first part is the first tool part and the second part is the second tool part, the travel distance of the first part in relation to the second part may be in the range from 10 mm to 200 mm.

Displacement sensor(s) may be installed with a pre-stretch between inter-movable parts of the press-working apparatus. For example, the first displacement sensor may be installed with a pre-stretch between the first part and the second part when the press-working apparatus is in an open position (also denoted first position). In one or more exemplary methods, the pre-stretch in the open position may be at least 10% of the length of the un-tensioned or relaxed displacement sensor. In one or more exemplary methods, the pre-stretch in the open position may be in the range from 50% to 90% of the length of the un-tensioned or relaxed displacement sensor.

The first displacement sensor may be installed with a pre-stretch between the first part and the second part when the press-working apparatus is in a closed position (also denoted second position). In one or more exemplary methods, the pre-stretch in the closed position may be at least 10% of the length of the un-tensioned or relaxed displacement sensor. In one or more exemplary methods, the pre-stretch in the closed position may be in the range from 50% to 90% of the length of the un-tensioned or relaxed displacement sensor.

In one or more exemplary methods, providing a control signal indicative of an error to the press-working apparatus if the error criterion is met may comprise stopping the press-working apparatus if the error criterion is met. Thus, the control signal may be a stop signal.

Attachment parts of the displacement sensor are attached to respective first and second parts of the press-working apparatus to determine if the movement of the first part in relation to the second part is repeatable during operation, e.g. within ±0.5% or within ±0.1% depending on manufacturers requirements.

Figure 2:
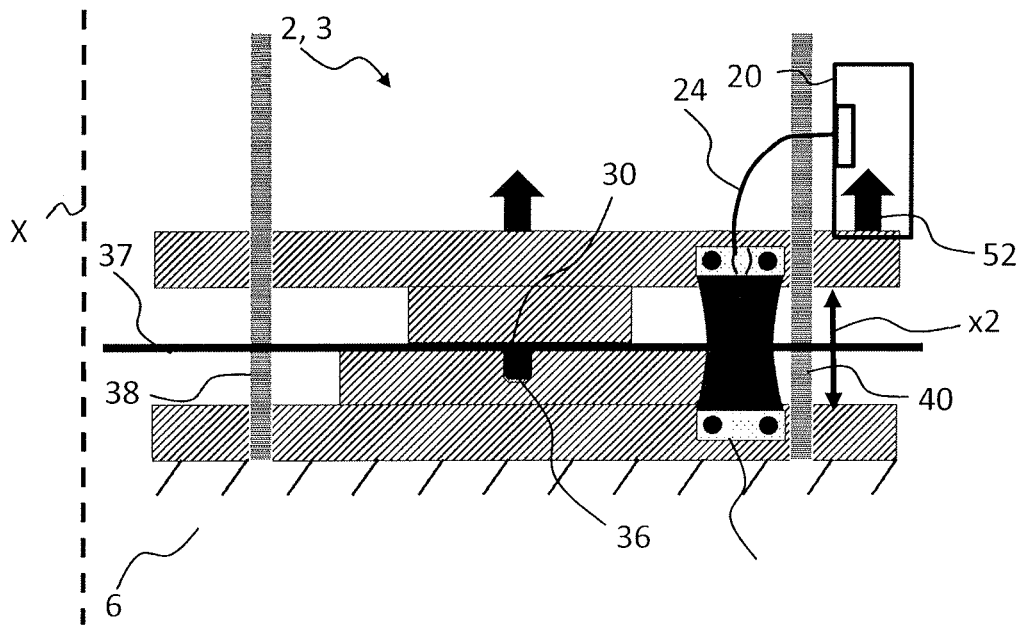

FIGS. 1 and 2 show an exemplary press-working apparatus comprising a press machine (not shown) and a tool 3 in an open position (initial or first position) and a closed position (engaged or second position), respectively. The press-working apparatus 2 comprises a first part 4 and a second part 6 arranged to be moved along a main axis X in relation to each other. The press-working apparatus 2 comprises one or more displacement sensors including a first displacement sensor 8 comprising a first primary attachment part 10, a first secondary attachment part 12 and a first sensing part 14, the first sensing part 14 being arranged between the first primary attachment part 10 and the first secondary attachment part 12. The first displacement sensor 8 is configured to provide a first output signal s1 indicative of deformation of the first sensing part 14 between first and second terminals on the first attachment part 10. The first primary attachment part 10 is attached to the first part 4, the first part 4 being a first tool part 16 of the tool 3. The first secondary attachment part 12 is attached to the second part 6, the second part 6 being a second tool part 18 of the tool 3. The press-working apparatus 2 comprises a press-working monitoring device 20, wherein the first displacement sensor 8 is connected to an interface 22 of the press-working monitoring device 20 via first cable 24 for obtaining the first output signal s1 from the first displacement sensor via first and second terminals arranged on the first primary attachment part 10 of the first displacement sensor 8. In another exemplary press-working apparatus, the first and second terminals are arranged on the first secondary attachment part 12 of the first displacement sensor 8. The first output signal s1 is indicative of the distance between the first tool part 16 and the second tool part 18. By determining the distance between the first tool part 16 and the second tool part 18 during operation cycles of the press-working apparatus, errors and/or malfunction of the press-working apparatus or parts thereof can be detected.

The first tool part 16 comprises a top plate 26, a punch holding plate 28 and one or more punches including a first punch 30. The second tool part 18 comprises a bottom plate 32 and a die 34 with one or more die slots including a first die slot 36. A blank 37 in the form of a metal sheet is arranged between the first tool part 16 and the second tool part 18. The tool 3 comprises one or more guides including a first guide 38 and second guide 40 accommodated in corresponding guide openings in the top plate 26 and bottom plate 32. The one or more guides are configured to guide the movement of the first tool part 16 along the main axis X in relation to the second tool part 18.

The first displacement sensor 8 is pre-stretched at least 5% in the closed position shown in FIG. 2. During an operation cycle of the press-working apparatus, the first part 4 is moved from the first (open) position shown in FIG. 1 in first direction 50 along the main axis X to the second (closed) position shown in FIG. 2 and back to the first position shown in FIG. 1 in second direction 52 along the main axis X. During an operation cycle, the blank 37 is punched with the first punch 30 and the first die slot 36 accommodates the first punch 30 in the second position. In the first position, the first part 4 and the second part 6 has a first distance x1 and in the second position, the first part 4 and the second part 6 has a second distance x2.

Figure 3:
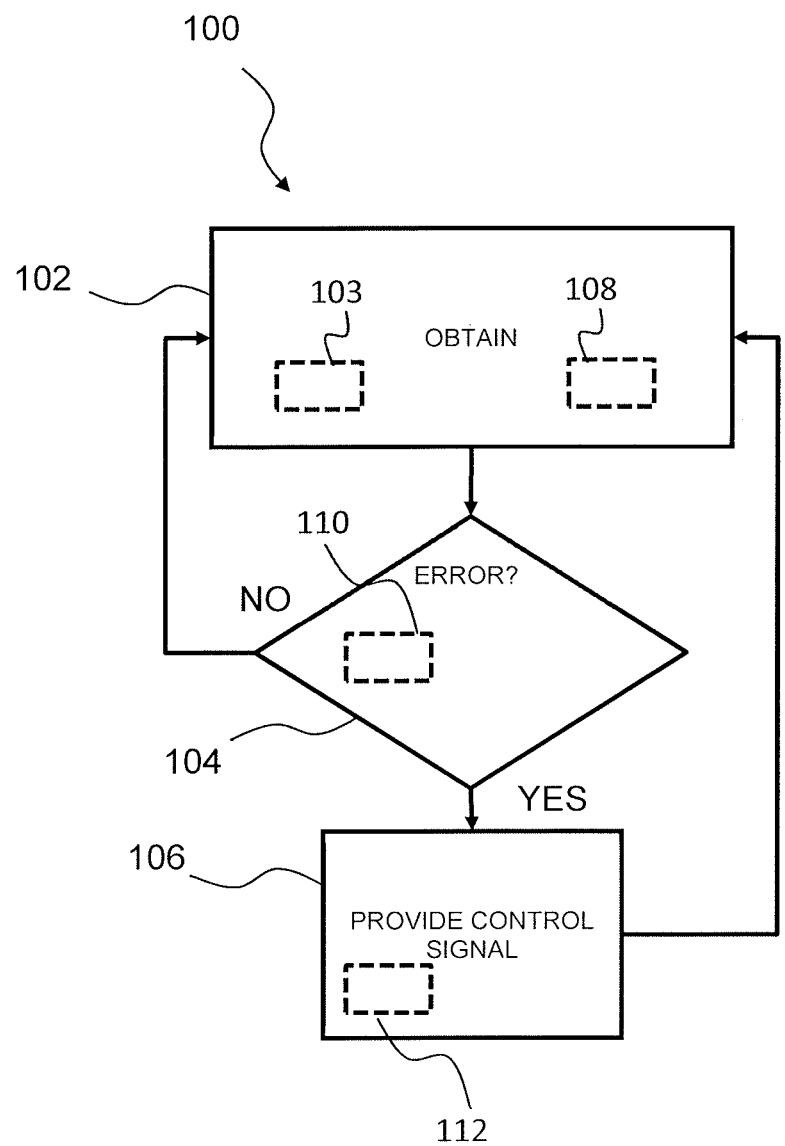

FIG. 3 illustrates an exemplary method of operating a press-working apparatus, such as press-working apparatus 100, 100A, with a press-working monitoring device, such as press-working monitoring device 20, and one or more displacement sensors including a first displacement sensor comprising a first primary attachment part mounted on a first part of the press-working apparatus, a first secondary attachment part mounted on a second part of the press-working apparatus, and a first sensing part, the first sensing part being arranged between the first primary attachment part and the first secondary attachment part, wherein the first displacement sensor is configured to provide a first output signal indicative of deformation of the first sensing part. The method 100 comprises obtaining 102 output signals from one or more displacement sensors mounted to parts of the press-working apparatus. Obtaining 102 output signals from one or more displacement sensors mounted to parts of the press-working apparatus comprises obtaining 103 the first output signal from the first displacement sensor while moving the first part and the second part along a main axis in relation to each other, thereby deforming the first displacement sensor. Further, method 100 comprises determining 104 if an error criterion based on the first output signal from the first displacement sensor has been met; and providing 106 a control signal indicative of an error to the press-working apparatus if the error criterion is met. The one or more displacement sensors may include a second displacement sensor comprising a second primary attachment part, a second secondary attachment part and a second sensing part, the second sensing part being arranged between the second primary attachment part and the second secondary attachment part, wherein the second primary attachment part and the second secondary attachment part are mounted on inter-movable parts of the press-working apparatus, wherein the second displacement sensor is configured to provide a second output signal indicative of deformation of the second sensing part. The method may comprise obtaining 108 the second output signal from the second displacement sensor while moving the inter-movable parts in relation to each other, thereby deforming the second displacement sensor, and the error criterion may be based on the second output signal from the second displacement sensor. In the method 100, wherein determining 104 if an error criterion based on the first output signal from the first displacement sensor has been met may comprise determining 110 a first travel distance parameter d1 and a second travel distance parameter d2 based on the first output signal s1. The first travel distance parameter d1 is indicative of travel distance between the first part and the second part in a first operating period of the press-working apparatus and the second travel distance parameter is indicative of travel distance between the first part and the second part in a second operating period of the press-working apparatus. The error criterion may be based on the first travel distance parameter and/or the second travel distance parameter. The error criterion is met if a relation between the first travel distance parameter and the second travel distance parameter is larger than an error threshold. For example, the error criterion may be met if the relation between the first travel distance parameter and the second travel distance parameter is indicative of a travel distance difference between the first operating period and the second operating period of at least in the range from 0.050 mm to 0.5 mm. Further, the error criterion may be met if the relation between the first travel distance parameter and the second travel distance parameter is indicative of a travel distance difference between the first operating period and the second operating period of at least in the range from 0.010 mm to 0.050 mm. Obtaining 103 the first output signal from the first displacement sensor comprises applying a current to the first displacement sensor, and wherein the first output signal is a voltage signal.

In the method 100, the first part of the press-working apparatus is a first tool part comprising the top plate of the tool or the first part of the press-working apparatus is a third tool part comprising a middle plate of the tool. In the method 100, the second part of the press-working apparatus is a second tool part comprising the bottom plate of the tool. The first part and the second part has a travel distance TD (TD=x1−x2) in relation to each other during operation of the press-working apparatus, wherein x1 is the distance between the first part and the second part in the open position and x2 is the distance between the first part and the second part in the closed position. The travel distance TD of the first part in relation to the second part is at least 5 mm. Further, the first displacement sensor is installed with a pre-stretch between the first part and the second part when the press-working apparatus is in an open position and the first displacement sensor is installed with a pre-stretch between the first part and the second part when the press-working apparatus is in a closed position. In the method 100, providing a control signal Xcontrol indicative of an error to the press-working apparatus if the error criterion is met comprises stopping 112 the press-working apparatus if the error criterion is met. Thus, the control signal Xcontrol may be a stop signal if the error criterion is met.

Figure 4:
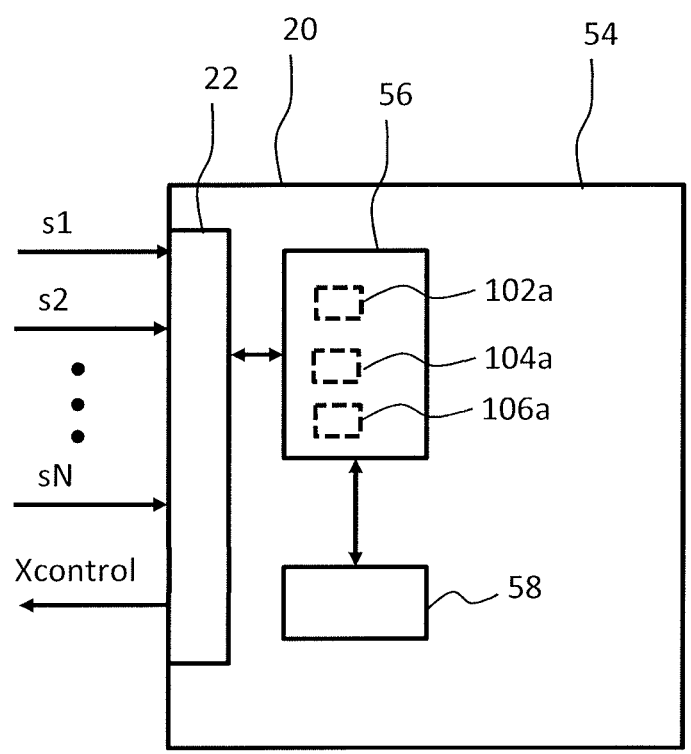

FIG. 4 schematically illustrates an exemplary press-working monitoring device for a press-working apparatus. The press-working monitoring device 20 comprises a housing 54 with a processor unit 56, a memory 58 and interface 22. The press-working monitoring device 20 may be arranged to execute at least parts of methods of operating a press-working apparatus as disclosed herein. The press-working monitoring device or the processing unit 56 may further comprise a number of optional functional modules, such as any of an obtain module 102a configured to perform step 102, a determine module 104a configured to perform step 104, a providing module 106a configured to perform step 106. In general terms, each functional module may be implemented in hardware or in software. The monitor device is configured to obtain output signals s1, s2, . . . , sN from N displacement sensors including a first output signal from a first displacement sensor while moving a first part and a second part of the press-working apparatus along a main axis in relation to each other, thereby deforming the first displacement sensor. Further, the monitor device is configured to determine if an error criterion based on the first output signal from the first displacement sensor has been met; and provide a control signal Xcontrol indicative of an error to the press-working apparatus if the error criterion is met.

Figure 5:
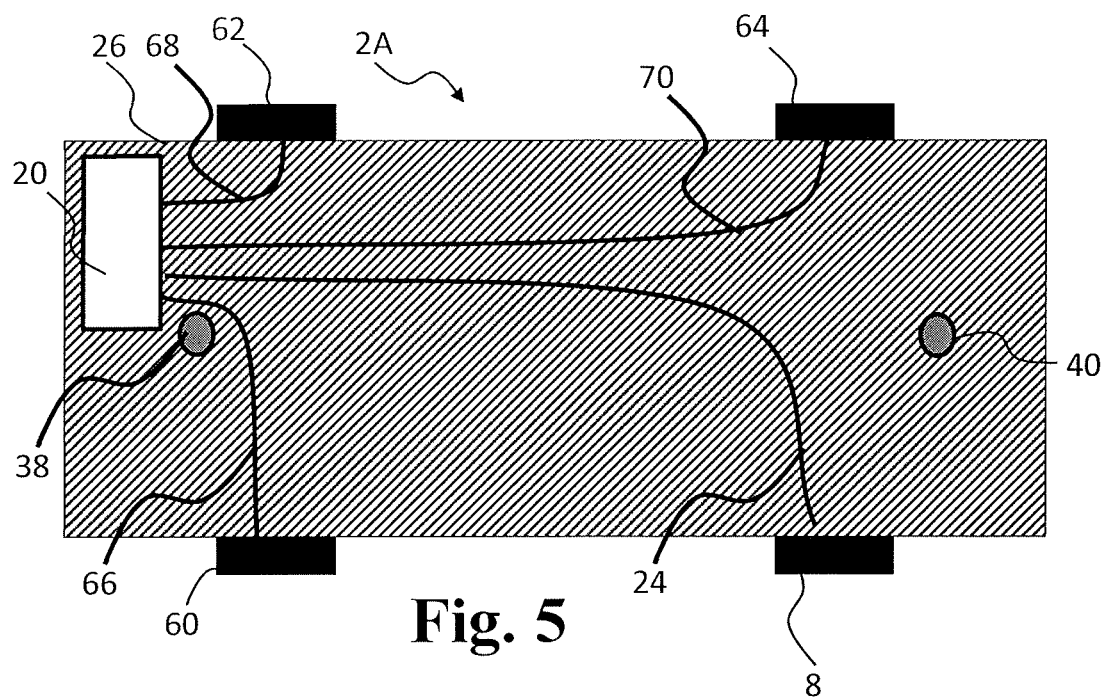
FIG. 5 is a top view of an exemplary press-working monitoring device.
Figure 6:
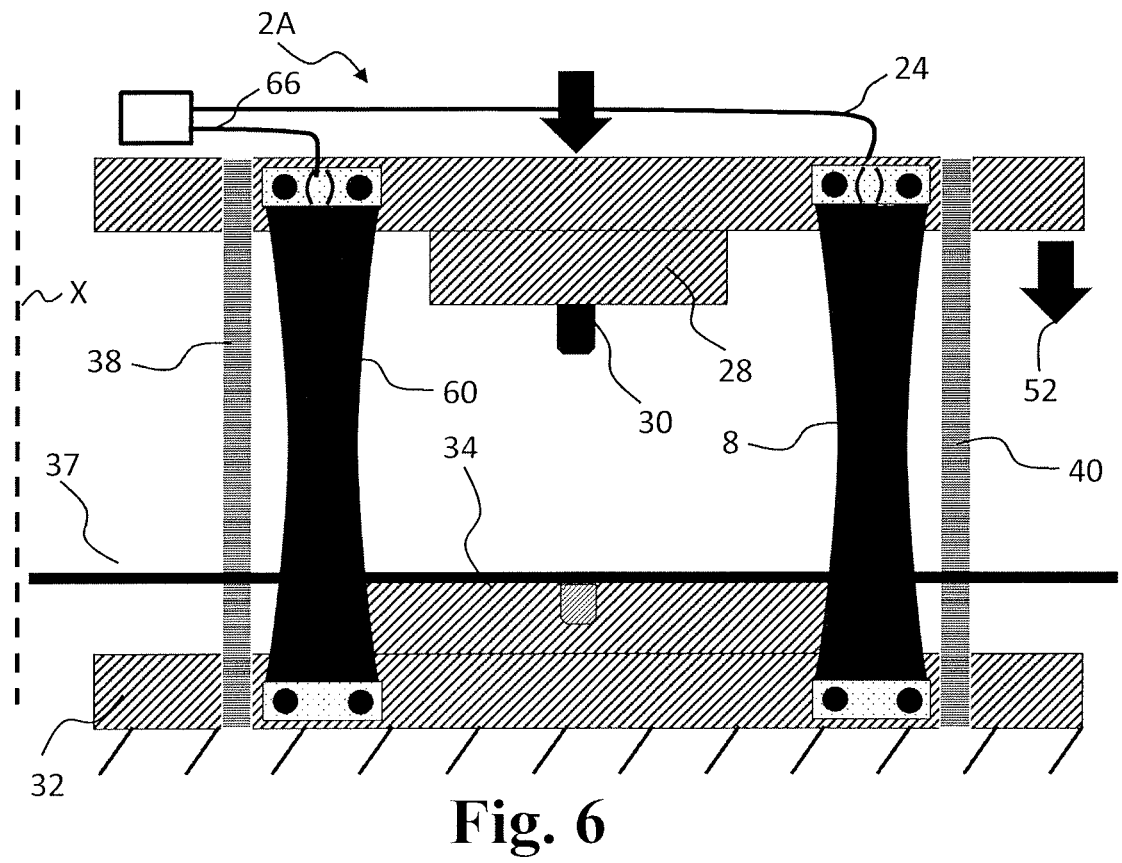
FIG. 6 is a side view of an exemplary press-working monitoring device, FIG. 7 schematically illustrates an exemplary press-working apparatus with the tool in open position, FIG. 8 schematically illustrates an exemplary press-working apparatus with the tool in closed position, FIG. 9 schematically illustrates an exemplary press-working apparatus with the tool in open position, FIG. 10 schematically illustrates an exemplary press-working apparatus with the tool in closed position, FIG. 11 schematically illustrates an exemplary press-working apparatus with the tool in open position.

FIGS. 5 and 6 illustrates an exemplary press-working apparatus, where FIG. 5 is a top view and FIG. 6 is a side view of a tool of an exemplary press-working apparatus 2A with four displacement sensors 8, 60, 62, 64 mounted between the top plate 26 and the bottom plate 32 of the tool.

The displacement sensors 8, 60, 62, 64 are connected to the press-working monitoring device 20 via respective cables 24, 66, 68, 70. Primary attachment parts of sensors 8, 60, 62, 64 are mounted on the top plate 26 and secondary attachment parts of sensors 8, 60, 62, 64 are mounted on the bottom plate 32. The press-working monitoring device 20 obtains output signals s1, s2, s3, s4 from respective displacement sensors 8, 60, 62, 64 and determines if an error criterion is met based on the output signals s1, s2, s3, s4. At least two displacement sensors, e.g. first displacement sensor 8 and third displacement sensor 62, are mounted to different sides of the top plate 26. At least two displacement sensors, e.g. first displacement sensor 8 and second displacement sensor 60, are mounted at a sensor distance of at least 5 cm on the same side of the top plate.

Figure 7:
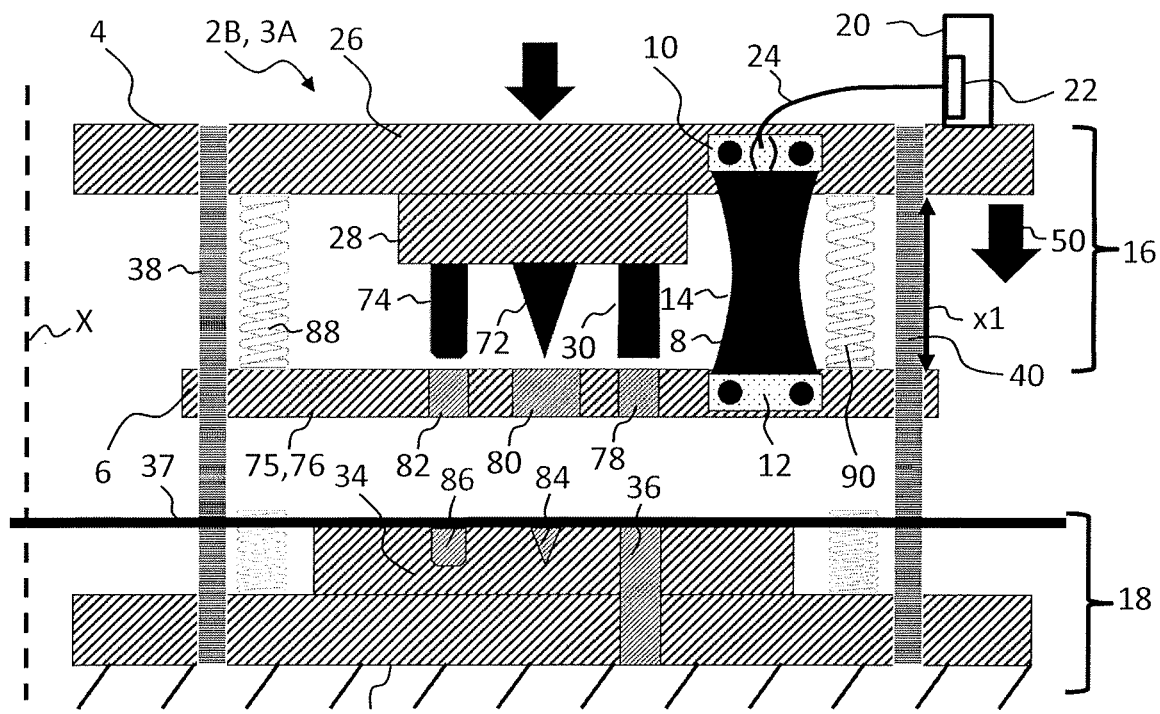
Figure 8:
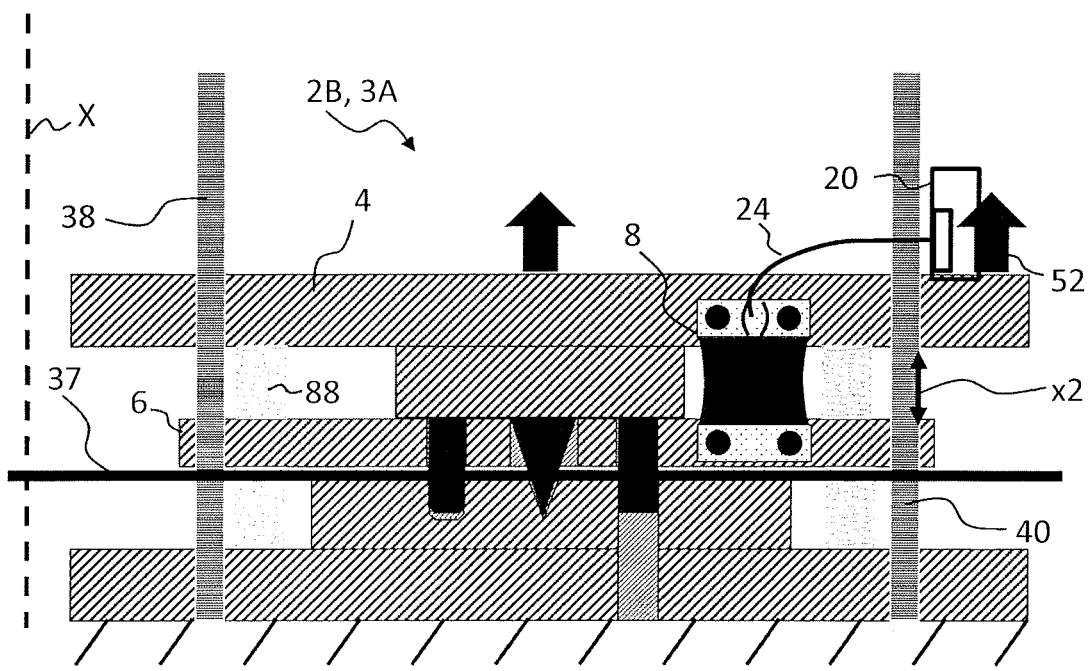

FIGS. 7 and 8 show side views of an exemplary press-working apparatus 2B comprising a press machine (not shown) and a tool 3A in an open position (initial or first position) and a closed position (engaged or second position), respectively. The press-working apparatus is a progressive press-working apparatus, wherein the first tool part 16 comprises a plurality of punches including first punch 30, second punch 72 and third punch 74, mounted on the punch holding plate 28. The tool 3A comprises a third tool part 75 including a middle plate 76 with respective punch slots 78, 80, 82. Further, the second tool part comprises respective die slots 36, 84, 86 for accommodating the punches 30, 72, 74. Two springs 88, 90 are arranged between the first tool part and the third tool part. The press-working apparatus 2B has one or more displacement sensors including first displacement sensor 8 with first primary attachment part mounted to the top plate 26 (first part 4) and first secondary attachment part mounted to middle plate 76 (third tool part 75, second part 6) of the tool 3A. A plurality of displacement sensors may be installed on press-working apparatus 2B, e.g. as shown in FIGS. 5 and 6. Further, one or more displacement sensors may be arranged between the third tool part 75 and the second tool part 18 or press-working apparatus 2B, e.g. as shown in FIG. 11.

Figure 9:
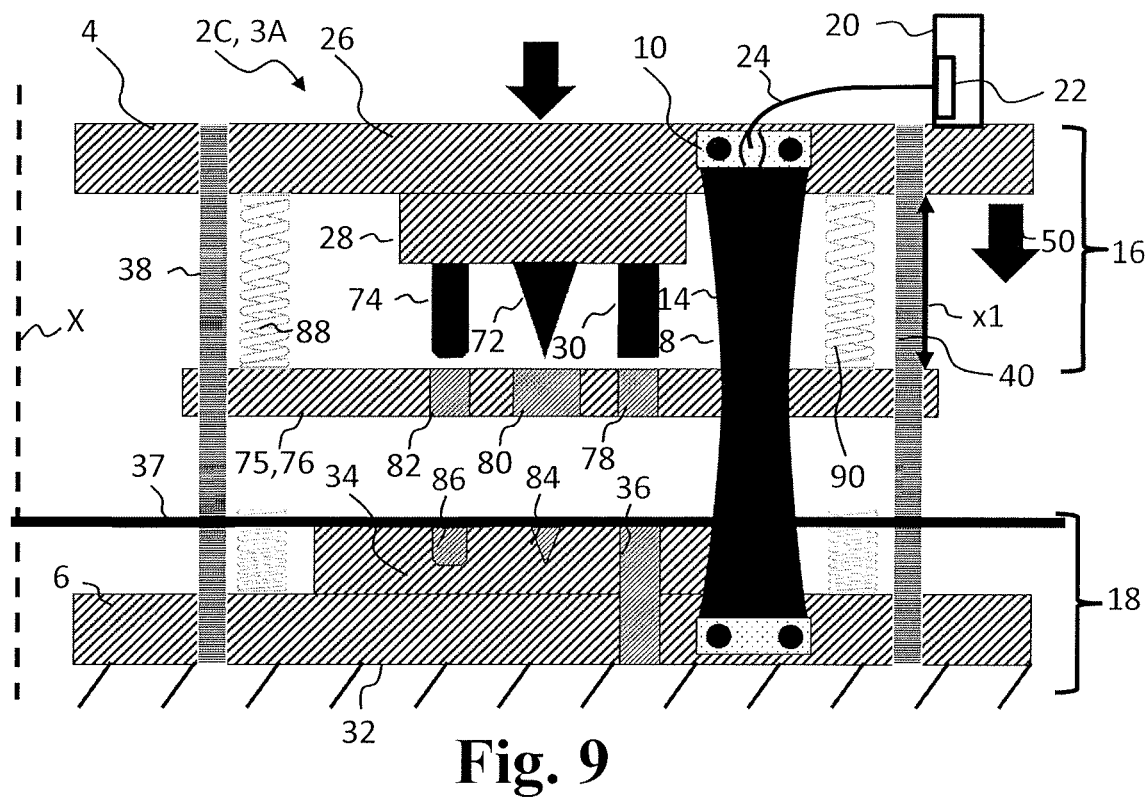
Figure 10:
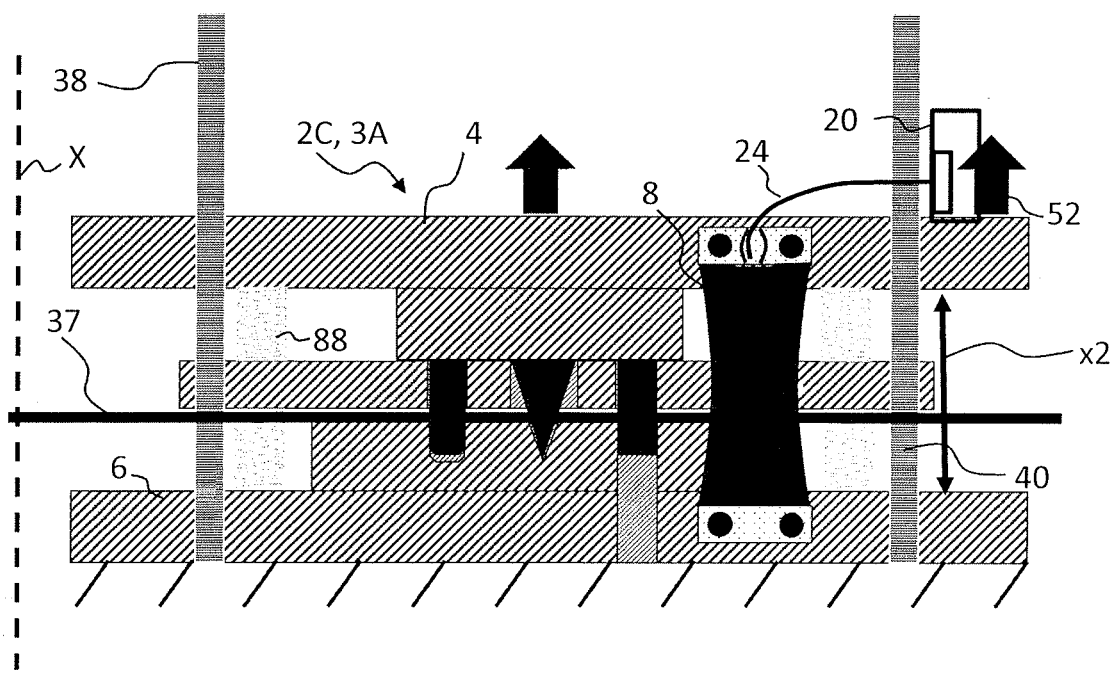

FIGS. 9 and 10 show side views of an exemplary press-working apparatus 2C comprising a press machine (not shown) and a tool 3A in an open position (initial or first position) and a closed position (engaged or second position), respectively. The press-working apparatus 2C has one or more displacement sensors including first displacement sensor 8 with first primary attachment part mounted to the top plate 26 (first part 4) and with first secondary attachment part mounted to the bottom plate 32 (second tool part 18, second part 6) of the tool 3A. A plurality of displacement sensors may be installed on press-working apparatus 2C, e.g. as also shown in FIGS. 5 and 6. Further, one or more displacement sensors may be arranged between the third tool part 75 and the second tool part 18 of press-working apparatus 2C, e.g. as also shown in FIG. 11.

Figure 11:
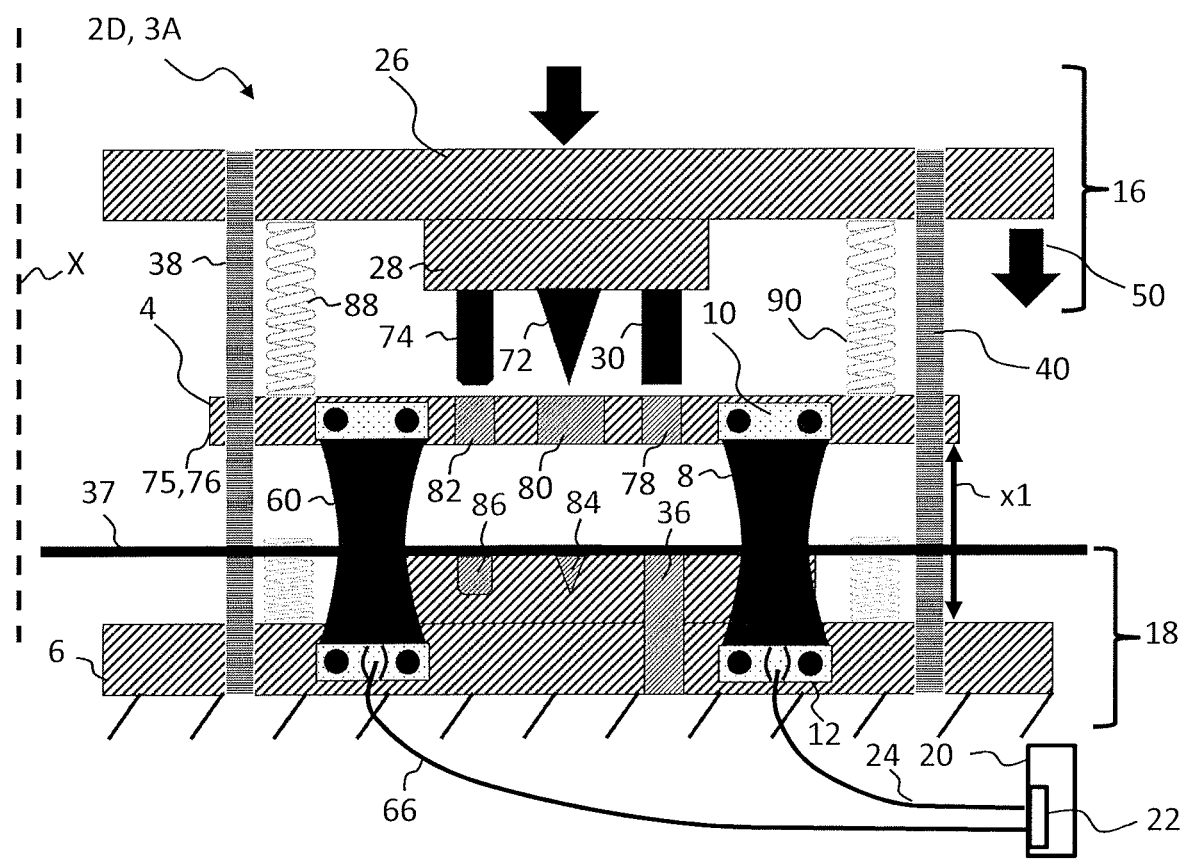

FIG. 11 shows a side view of an exemplary press-working apparatus 2D comprising a press machine (not shown) and a tool 3A in an open position (initial or first position). The press-working apparatus 2D has one or more displacement sensors including first displacement sensor 8 with first primary attachment part mounted to middle plate 26 (third tool part 75, first part 4) and with first secondary attachment part mounted to the bottom plate 32 (second tool part 18, second part 6) of the tool 3A. Further, the press-working apparatus 2D has second displacement sensor 60 with second primary attachment part mounted to middle plate 26 (third tool part 75, first part 4) and with second secondary attachment part mounted to the bottom plate 32 (second tool part 18, second part 6) of the tool 3A. The first and second terminals of displacement sensors 8, 60 are arranged on the secondary attachment part thereof. A third and fourth displacement sensor (not shown) are optionally arranged on the other side of the tool with primary attachment parts mounted on the first part 4 and secondary attachment parts mounted on the second part.

Figure 12:
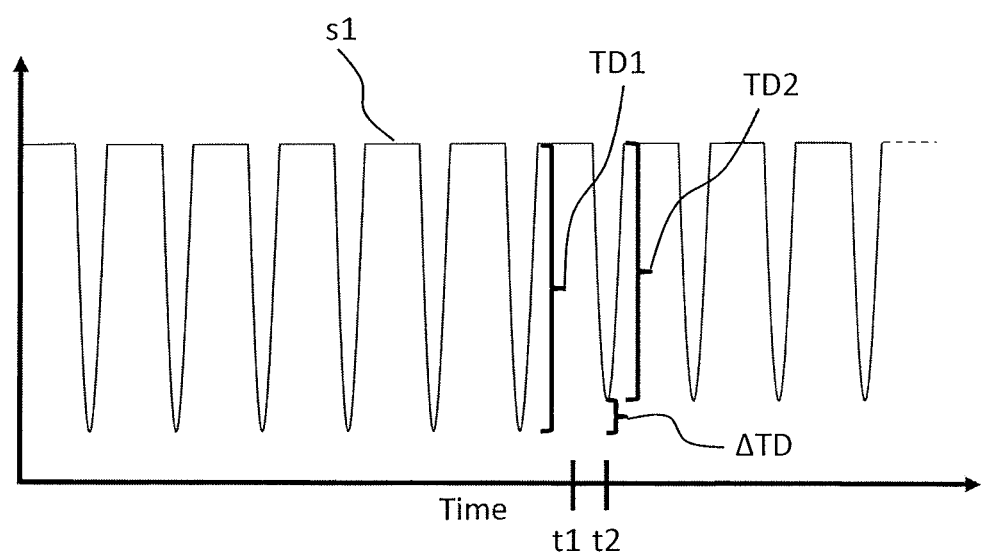
FIG. 12 shows an exemplary first output signal from a first displacement sensor.

FIG. 12 shows an exemplary graph with first output signal from a first displacement sensor during operation of the press-working apparatus. The first output signal s1 is indicative of the capacitance of the first displacement sensor. The first displacement sensor is mounted between top plate 26 (first part) and middle plate 76 (second part) of press-working apparatus with a travel distance TD1 between the first part and the second part in a first operating period. At time t1, metal residue from the stamping is trapped between the middle plate 75 and the blank 37 which has resulted in a shortened travel distance TD2 between the first part and the second part in a second operating period. This leads to a difference $\Delta TD$ in travel distance as detected by the first displacement sensor at time t2 by a change in the maximum amplitude of s1. The difference in travel distance $\Delta TD$ continues for four cycles. The error criterion is based on the first output signal s1 and the error criterion may be fulfilled, when $\Delta TD$ between two consecutive operating cycles is larger than a first error threshold.

Figure 13:
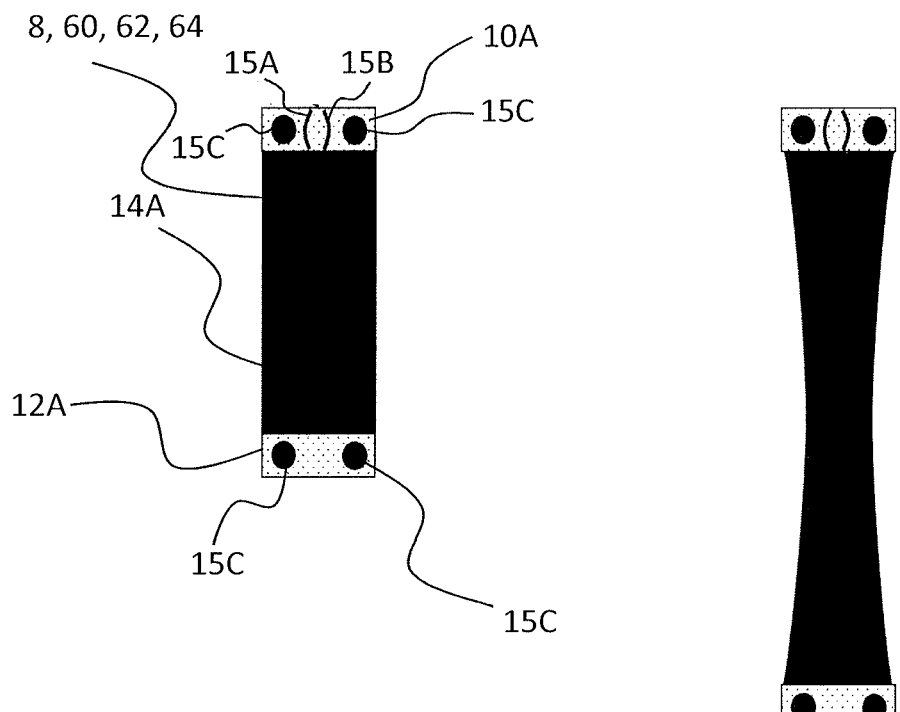
FIG. 13 shows an exemplary displacement sensor.

FIG. 13 schematically illustrates an exemplary displacement sensor used in the method and/or apparatus described herein. The displacement sensor 8, 60, 62, 64 is shown in a non-stretched or relaxed state (left) and a stretched state (right) and comprises a primary attachment part 10A, a secondary attachment part 12A and a sensing part 14A. The sensing part 14A can be stretched in the longitudinal direction of the displacement sensor. When the sensing part 14A is stretched, the sensing part is deformed and an output signal indicative of the deformation can be obtained from first terminal 15A and second terminal 15B arranged on the primary attachment part 10A. The terminals 15A, 15B may be arranged with a connector for attaching a cable connector of a cable to the displacement sensor. The displacement sensor 8, 60, 62, 64 shown in FIG. 13 has a stretchability of at least 1.5. One or more openings 15C are optionally arranged in each attachment part for mounting the displacement sensor between inter-movable parts.

Figure 14:
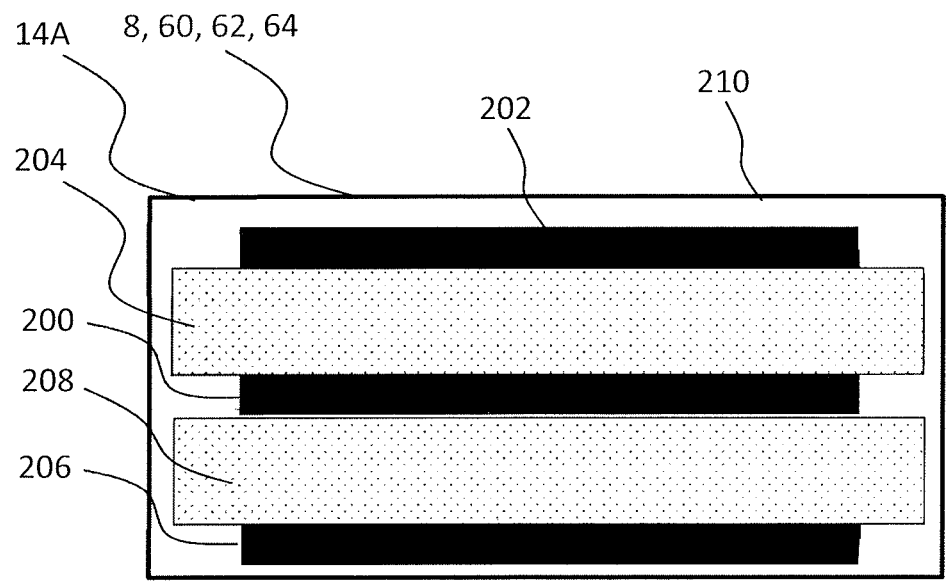
FIG. 14 shows a cross-section of an exemplary displacement sensor.

FIG. 14 is a schematic cross-section of the sensing part 14A perpendicular to the longitudinal direction of displacement sensor 8, 60, 62, 64. The displacement sensor comprises a primary layer 200 of a conductive polymer material and a first secondary layer 202 of a conductive polymer material, wherein the primary layer 200 and the first secondary layer 202 are separated by a first intermediate layer 204 of a dielectric material. The displacement sensor optionally comprises a second secondary layer 206 of conductive polymer, wherein the primary layer 200 and the second secondary layer 206 are separated by a second intermediate layer 208 of a dielectric material. The primary layer 200 is connected to the first terminal 15A and the first and second secondary layers 202, 206 are connected to the second terminal 15B. Thus, the electrical properties of the sensing part and changes thereof, such as the capacitance between conductive layers 200 and 202, 206 can be measured as an output signal between first and second terminals 15A, 15B. In other exemplary displacement sensors, e.g. a resistive displacement sensor, the second terminal 15B of the displacement sensor may be connected to the primary layer 200, e.g. at the secondary attachment part. The layers 200, 202, 204, 206, 208 are embedded in a protecting body material 210.

The use of the terms "first", "second", "third" and "fourth", "primary", "secondary", "tertiary", "quaternary", etc. does not imply any order, but are included to identify individual elements. Moreover, the use of the terms "first", "second", "third" and "fourth", "primary", "secondary", "tertiary", "quaternary", etc. does not denote any order or importance, but rather the terms are used to distinguish one element from another unless otherwise indicated. Note that the words "first", "second", "third" and "fourth", "primary", "secondary", "tertiary", "quaternary", etc. are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2, 2A, 2B, 2C press-working apparatus
3, 3A tool
4 first part
6 second part
8 first displacement sensor
10 first primary attachment part
10A primary attachment part
12 first secondary attachment part
12A secondary attachment part
14 first sensing part
14A sensing part
15A first terminal
15B second terminal
16 first tool part
18 second tool part
20 press-working monitoring device
22 interface
24 first cable
26 top plate
28 punch holding plate
30 first punch
32 bottom plate
34 die
36 first die slot
37 blank
38 first guide
40 second guide
50 first direction
52 second direction
54 housing
56 processor unit
58 memory
60 second displacement sensor
62 third displacement sensor
64 fourth displacement sensor
66 second cable
68 third cable
70 fourth cable
72 second punch
74 third punch
75 third tool part
76 middle plate
78 first punch slot
80 second punch slot
82 third punch slot
84 second die slot
86 third die slot
88 first spring
90 second spring
100 method
102 obtain
102a obtain module
103 obtain first output signal
104 determining if an error criterion has been met
104a determine module
106 providing a control signal if the error criterion is met.
106a providing
108 obtain second output signal
110 determining first and second travel distance parameters
112 stopping the press-working apparatus
200 primary layer of conductive polymer material
202 first secondary layer of conductive polymer material
204 first intermediate layer of dielectric material
206 second secondary layer of conductive polymer material
208 second intermediate layer of dielectric material
210 body material
s1 first output signal from first displacement sensor
s2 second output signal from second displacement sensor
s3 third output signal from third displacement sensor
s4 third output signal from third displacement sensor
Xcontrol control signal from press-working monitoring device
X main axis

The invention claimed is:

1. A method of operating a press-working apparatus with a press-working monitoring device and one or more displacement sensors including a first displacement sensor having a stretchability of at least 1.1 and comprising a first primary attachment part mounted on a first part of the press-working apparatus wherein the first part is a first tool part, a first secondary attachment part mounted on a second part of the press-working apparatus wherein the second part is a second tool part, and a first sensing part, the first sensing part being arranged between the first primary attachment part and the first secondary attachment part, wherein the first displacement sensor is configured to provide a first output signal indicative of deformation of the first sensing part, wherein the first part and the second part has a travel distance in relation to each other during operation of the press-working apparatus, wherein the travel distance is at least 5 mm, and wherein the method comprises:

obtaining the first output signal from the first displacement sensor while moving the first part and the second part along a main axis in relation to each other, thereby deforming the first displacement sensor;

determining if an error criterion based on the first output signal from the first displacement sensor has been met; and providing a control signal indicative of an error to the press-working apparatus if the error criterion is met.

2. The method according to claim 1, wherein the one or more displacement sensors includes a second displacement sensor having a second primary attachment part, a second secondary attachment part and a second sensing part, the second sensing part being arranged between the second primary attachment part and the second secondary attachment part, wherein the second primary attachment part and the second secondary attachment part are mounted on inter-movable parts of the press-working apparatus, wherein the second displacement sensor is configured to provide a second output signal indicative of deformation of the second sensing part, wherein the method comprises:

obtaining the second output signal from the second displacement sensor while moving the inter-movable parts in relation to each other, thereby deforming the second displacement sensor, and wherein the error criterion is based on the second output signal from the second displacement sensor.

3. The method according to claim 1, wherein determining if an error criterion based on the first output signal from the first displacement sensor has been met includes determining a first travel distance parameter and a second travel distance parameter based on the first output signal, wherein the first travel distance parameter is indicative of travel distance between the first part and the second part in a first operating period of the press-working apparatus and the second travel distance parameter is indicative of travel distance between the first part and the second part in a second operating period of the press-working apparatus, and wherein the error criterion is met if a relation between the first travel distance parameter and the second travel distance parameter is larger than an error threshold.

4. The method according to claim 3, wherein the error criterion is met if the relation between the first travel distance parameter and the second travel distance parameter is indicative of a travel distance difference between the first operating period and the second operating period of at least in the range from 0.050 mm to 0.5 mm.

5. The method according to claim 3, wherein the error criterion is met if the relation between the first travel distance parameter and the second travel distance parameter is indicative of a travel distance difference between the first operating period and the second operating period of at least in the range from 0.010 mm to 0.050 mm.

6. The method according to claim 1, wherein obtaining the first output signal from the first displacement sensor comprises applying a current to the first displacement sensor, and wherein the first output signal is a voltage signal.

7. The method according to claim 1, wherein the first displacement sensor is installed with a pre-stretch between the first part and the second part when the press-working apparatus is in an open position.

8. The method according to claim 1, wherein the first displacement sensor is installed with a pre-stretch between the first part and the second part when the press-working apparatus is in a closed position.

9. The method according to claim 1, wherein providing a control signal indicative of an error to the press-working apparatus if the error criterion is met includes stopping the press-working apparatus if the error criterion is met.

10. A Press-working monitoring device for a press-working apparatus, the press-working monitoring device comprising a housing with a processor, a memory, and an interface, wherein the press-working monitoring device is configured to:

obtain a first output signal from a first displacement sensor having a stretchability of at least 1.1 while moving a first part and a second part of the press-working apparatus along a main axis in relation to each other, wherein the first part is a first tool part and the second part is a second tool part, thereby deforming the first displacement sensor, wherein the first part and the second part has a travel distance in relation to each other during operation of the press-working apparatus, wherein the travel distance is at least 5 mm;

determine if an error criterion based on the first output signal from the first displacement sensor has been met; and provide a control signal indicative of an error to the press-working apparatus if the error criterion is met.

11. A press-working apparatus comprising:

a first part and a second part arranged to be moved along a main axis in relation to each other, wherein the first part is a first tool part and the second part is a second tool part, wherein the press-working apparatus includes one or more displacement sensors including a first displacement sensor having a stretchability of at least 1.1 and having a first primary attachment part, a first secondary attachment part and a first sensing part, the first sensing part being arranged between the first primary attachment part and the first secondary attachment part, wherein the first displacement sensor is configured to provide a first output signal indicative of deformation of the first sensing part, and wherein the first primary attachment part is attached to the first part and the first secondary attachment part is attached to the second part, wherein the first part and the second par has a travel distance in relation to each other during operation of the press-working apparatus, wherein the travel distance is at least 5 mm; and a press-working monitoring device comprising:

a housing with a processor, a memory, and an interface, wherein the press-working monitoring device is configured to:

obtain the first output signal from the first displacement sensor while moving the first part and the second part of the press-working apparatus along the main axis in relation to each other, thereby deforming the first displacement sensor;

determine if an error criterion based on the first output signal from the first displacement sensor has been met; and provide a control signal indicative of an error to the press-working apparatus if the error criterion is met;

wherein the first displacement sensor is connected to the interface of the press-working monitoring device.

\* \* \* \* \*